United States Patent [19]

Lorenz et al.

[11] 3,963,688

[45] June 15, 1976

[54] METHOD OF EMULSION POLYMERIZATION USING PHOSPHATE ESTERS OF NORMAL ALKANOLS AS SURFACTANT

[75] Inventors: Donald H. Lorenz, Basking Ridge, N.J.; Earl P. Williams, Pen Argyl, Pa.

[73] Assignee: GAF Corporation, New York, N.Y.

[22] Filed: Aug. 2, 1974

[21] Appl. No.: 494,333

[52] U.S. Cl. .............................. 526/193; 526/236; 526/250; 526/255; 526/265; 526/268; 526/280; 526/296; 526/292; 526/299; 526/303; 526/317; 526/319; 526/332; 526/335; 526/341; 526/343; 526/344; 526/345; 260/45.7 P; 260/63 R; 260/67 UA
[51] Int. Cl.² ............... C08F 14/06; C08F 214/06; C08F 218/08

[58] Field of Search ............... 260/92.8 R, 92.8 W, 260/87.5 R, 87.1, 85.5 D

[56] References Cited
UNITED STATES PATENTS

| | | | |
|---|---|---|---|
| 3,366,584 | 1/1968 | Zimmerman | 260/887 |
| 3,640,954 | 2/1972 | Kraft | 260/92.8 W |

*Primary Examiner*—Harry Wong, Jr.
*Attorney, Agent, or Firm*—W. C. Kehm; J. J. Ward

[57] ABSTRACT

The mono- or diester of phosphoric acid and a straight chain alkanol of 8 to 10 carbon atoms is used as a surfactant in the emulsion polymerization of olefinic compounds, especially vinyl compounds, to obtain polymers having improved stability to light and heat.

12 Claims, No Drawings

METHOD OF EMULSION POLYMERIZATION USING PHOSPHATE ESTERS OF NORMAL ALKANOLS AS SURFACTANT

The present invention relates to the emulsion polymerization of olefinic monomers and/or of conjugated diolefins, and more particularly to the emulsion polymerization of vinyl chloride to form homopolymers and copolymers thereof.

The well known emulsion polymerization of olefinic monomers employs a variety of surfactants, but these surfactants often give rise to unstable latices and/or result in low conversion. When the latices are used to form films, the surfactant remains in the film and, particularly in the case of sulfur-containing surfactants, causes undesired color changes when the film is subjected to heat or light.

It is therefore an object of the invention to provide an improved emulsion polymerization of olefinic monomers having good rates of conversion and resulting in a stable polymer latex.

It is another object of the invention to provide an improved emulsion polymerization of olefinic monomers that results in a polymer that has improved color stability to the effects of heat and light.

These objects are accomplished by the present invention, which provides a process for the emulsion polymerization of an olefinic monomer using a phosphate ester of a straight chain alkanol having 8 to 10 carbon atoms.

The monomer to be polymerized may be at least one olefinic compound containing one or more carbon-to-carbon double bonds. Monomers which may be polymerized are the vinyl halides, i.e., vinyl chloride, vinyl fluoride, vinyl bromide and vinyl iodide; the vinylidene halides, i.e., vinylidene chloride, vinylidene fluoride, vinylidene bromide, and vinylidene iodide; 2-halogenobutadienes; esters of unsaturated alcohols with mono- and polybasic saturated and unsaturated acids, such as vinyl acetate, allyl acetate, diallyl maleate, etc.; esters of saturated alcohols with mono- and polybasic unsaturated acids, such as methyl acrylate, ethyl acrylate, methyl methacrylate, ethyl methacrylate, haloacrylates, diethyl maleate, diethyl fumarate, etc.; unsaturated ethers, such as divinyl ether, diallyl ether, vinyl alkyl ethers, allyl alkyl ethers; unsaturated nitriles, such as acrylonitrile, methacrylonitrile, haloacrylonitriles, phenyl acrylonitriles, vinylidene cyanide, etc.; unsaturated amides, such as acrylamide, methacrylamide, N-substituted unsaturated amides, e.g., N,N-dimethyl acrylamide, N,N-diethylacrylamide, N-methylacrylamide, etc.; unsaturated acids and anhydrides, such as acrylic acid, methacrylic acid, crotonic acid, itaconic acid, maleic anhydride, etc.; unsaturated ketones, such as divinyl ketone, vinyl alkyl ketones, etc.; unsaturated aldehydes and acetals, such as acrolein and its acetals, methacrolein and its acetals, etc.; unsaturated aromatic compounds, such as divinyl benzene, styrene, mono- and polyhalo styrenes, alkyl styrenes, cyano styrenes, allylbenzene, vinyl naphthalene, etc.; unsaturated heterocyclic compounds, such as vinyl pyridine, vinyl furan, vinyl coumarone, vinyl dibenzofuran, N-vinyl carbazole, etc.; and unsaturated alicyclic compounds, such as vinylcyclopentane, vinyl cyclohexane, etc.

Homopolymers or copolymers of dienes may also be prepared by the method of the invention, and suitable diene monomers include butadiene, 2,3-dimethyl-1,3-butadiene, isoprene, piperylene, 3-furyl-1,3-butadiene, 3-methoxy-1,3-butadiene, etc.

The surfactant to be used in the improved process has the general formula:

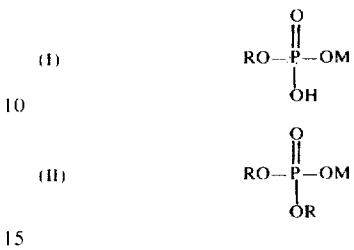

or where R is straight chain alkyl of 8 to 10 carbon atoms, and M is hydrogen or a metal, ammonium or amino cation. Suitable metal cations are sodium, potassium and lithium. Suitable amino cations are derived from ammonia and primary, secondary and tertiary aliphatic, aromatic and/or heterocyclic amines. The preferred ammonium and amino cations have the formula:

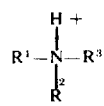

wherein $R^1$, $R^2$ and $R^3$ are independently hydrogen, alkyl of 1 to 6 carbon atoms, hydroxyalkyl of 1 to 6 carbon atoms and cycloalkyl of 3 to 6 carbon atoms.

The phosphate ester used as the surfactant in the method of the present invention may be prepared by esterifying $P_2O_5$ with an alkanol of the formula ROH, where R is as defined above, to obtain the phosphate ester of formula I or II above, where M is hydrogen. The resulting product can then be neutralized with a base MOH, where M is a metal, or with ammonium hydroxide or an amine, to provide the desired ester of formula I or II, where M is a metal, ammonium or amino cation.

Straight chain alcohols of 8 to 10 carbon atoms are readily available. Mixtures of the alcohols may be separately formed, or may be obtained as such. Thus, Continental Oil Company sells a mixture of 43% $C_8$ straight chain alcohol and 57% $C_{10}$ straight chain alcohol under the trademark "Alfol 810", and this is a convenient mixture to use.

The emulsion polymerization is carried out under conventional conditions of temperature, pressure, agitation and the like, using watersoluble initiators known in the art for this purpose, such as ammonium persulfate, potassium persulfate, hydrogen peroxide, and various redox systems, such as chlorate-bisulfite systems. While batch operation is predominantly used in the United States for emulsion polymerization, continuous operation may be used, if desired. A suitable recipe is as follows:

|  | Parts |
| --- | --- |
| Monomer or mixture of monomers | 100 |
| Water | 100 to 300 |
| Phosphate ester surfactant | 2 to 10 |
| Water-soluble initiator | 0.1 to 3 |

Other additives, such as plasticizers, may be charged to the autoclave along with this reaction mixture.

The present invention is illustrated by the following Examples. All parts and proportions as referred to herein and in the appended claims are by weight unless otherwise indicated.

EXAMPLE 1

A phosphate ester surfactant suitable for use in the present invention was prepared as follows. 426 g. of $P_2O_5$ (anhydrous) was added under nitrogen to a mixture of 1020 g. of "Alfol 810" and 3 ml of a 50% aqueous solution of hypophosphorous acid, with cooling to keep the temperature below 50°C, over a period of 1 ¾ hours. The reaction mass was then heated to 100°C for 1 hour and then cooled to 50°–60°C. Three milliliters of a 36% aqueous solution of hydrogen peroxide was added to the cooled reaction product to obtain a water white colored mixture of the mono- and diphosphoric acid ester in a yield of 1045 g. The product analyzed 23% of the monoester
and 77% of the diester

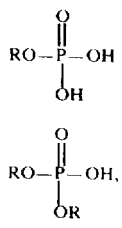

where R is a mixture of 43% n-octyl and 57% n-decyl.

This phosphate ester is neutralized with sodium hydroxide to form the sodium salt thereof, and designated surfactant A.

EXAMPLE 2

Several surfactants were employed in the emulsion polymerization of vinyl chloride and vinyl acetate using the ingredients set forth below to compare the phosphate ester surfactant of the invention with other phosphate esters. These comparative phosphate esters had the formula below:

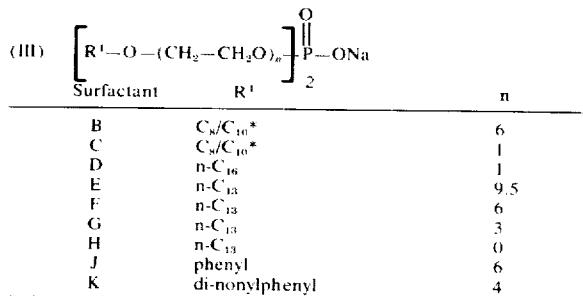

| Surfactant | R' | n |
|---|---|---|
| B | $C_8/C_{10}$* | 6 |
| C | $C_8/C_{10}$* | 1 |
| D | n-$C_{16}$ | 1 |
| E | n-$C_{13}$ | 9.5 |
| F | n-$C_{13}$ | 6 |
| G | n-$C_{13}$ | 3 |
| H | n-$C_{13}$ | 0 |
| J | phenyl | 6 |
| K | di-nonylphenyl | 4 |

*mixture of 43% n-$C_8$ and 57% n-$C_{10}$

| | Parts |
|---|---|
| Distilled Water (total) | 386.0 |
| Surfactant (100% basis) | 9.2 |
| Vinyl Chloride (uninhibited) | 389.1 |
| Vinyl Acetate (15 ppm Hydroquinone) | 48.1 |
| Potassium Chloride (C.P.) | 1.0 |
| Sodium Bicarbonate (C.P.) | 2.5 |
| Potassium Persulfate (C.P.) | 1.5 |
| Sodium Hydroxide (50%) | Adjust to pH 8.7 |

The water, surfactant and potassium chloride are mixed and the pH adjusted to 8.7 by addition of a few drops of 50% NaOH. The sodium bicarbonate is then added and the solution charged to a previously nitrogen purged and evacuated ½-gallon glass reactor. The solution in the reactor is purged and evacuated five more times. The monomers are added from previously nitrogen purged and evacuated cylinders and finally the potassium persulfate previously dissolved in 40ml distilled water (included in 386 g total purged with nitrogen in an addition cylinder) is added and the contents heated to 50°C while stirring at 200 RPM. The starting pressure on reaching 50° is near 90–95 psig. Reaction rate was judged by pressure drop.

The results are reported in Table I below:

Table I

| Run | Surfactant | Rate of Conversion | Latex Property |
|---|---|---|---|
| 1 | A | good | Fluid (no coagulum) |
| 2 | B | fair | Paste |
| 3 | C | good | Thick |
| 4 | D | slow | Thick paste |
| 5 | E | slow | Thick paste |
| 6 | F | fair | Paste |
| 7 | G | good | Fluid (8% coagulum) |
| 8 | H | slow | Paste |
| 9 | J | — | Incomplete reaction |
| 10 | K | — | 6% Coagulum |

These results demonstrate the importance of the $C_8$ to $C_{10}$ straight chain alkyl in the phosphate ester surfactant. Higher chain alkyl, alkyl containing ethoxy groups, or substituted phenol, are not nearly as effective as the $C_8$ to $C_{10}$ straight chain alkyl.

EXAMPLE 3

The following Example compares the thermal stability of films made from the latex obtained from the method of the present invention to films made using sulfur-containing surfactants.

The following recipe was used to form the copolymer of vinyl chloride and vinyl acetate.

| | Parts |
|---|---|
| Distilled Water (total) | 469.5 |
| Surfactant (100% basis) | 9.2 |
| Vinyl Chloride (uninhibited) | 272.4 |
| Vinyl Acetate (15 ppm hydroquinone) | 48.1 |
| Dibutyl Phthalate (Baker grade) | 137.3 |
| Potassium Chloride | 1.0 |
| Sodium Bicarbonate | 2.0 |
| Potassium Persulfate | 1.5 |
| Sodium Hydroxide (50%) | to adjust pH to 8.7 |

The water, surfactant, and potassium chloride are mixed and pH adjusted to 8.7 by addition of 50% NaOH. The sodium bicarbonate is then added and the solution charged to a previously nitrogen purged and evacuated ½-gallon glass reactor. The dibutyl phthalate is then charged and the mixture is purged and evacuated five more times. Monomers are added from previously nitrogen purged and evacuated cylinders, and finally the potassium persulfate previously dissolved in 40 ml distilled water is added and the contents heated to 50°, while stirring at 200 RPM. The starting pressure at 50°C is 80–90 psig.

The results are reported in Table II below:

Table II

| Surfactant | Solids (%) | Brookfield Visc. (cps) | Heat Stability Test on 10 Mil Films at 105°; Varnish Color No. at | | |
|---|---|---|---|---|---|
| | | | 5 hrs | 8 hrs | 16 hrs |
| Sodium lauryl sulfate | 47 | 21.5 | 11 | 13 | 13 |
| Sodium dodecyl benzene sulfonate | 46 | 11.0 | 6 | 9 | 9 |
| Surfactant A | 48 | 13 | 4 | 5 | 7 |

These results distinctly show that the film made with the phosphate ester of the invention gave improved color stability on heating.

EXAMPLE 4

To compare Surfactant A to the phosphate ester of 2-ethylhexanol, an emulsion polymerization of vinyl chloride and ehtyl acrylate was carried out using the following recipe.

| | Parts |
|---|---|
| Distilled Water (total) | 200.0 |
| Surfactant (100% basis) | 6.4 |
| Vinyl Chloride (uninhibited) | 190.4 |
| Ethyl Acrylate (15 ppm MEHQ) | 22.1 |
| Potassium Chloride (C.P.) | 1.0 |
| Potassium Persulfate (C.P.) | 0.4 |
| Sodium Hydroxide (7.6%) | 16.5 |

The water, surfactant and potassium chloride are mixed and the pH adjusted to 7.0 by addition of sodium hydroxide. This solution is then charged to the autoclave along with the ethyl acrylate and potassium persulfate. The autoclave is then purged with nitrogen and evacuated prior to addition of the vinyl chloride from a previously purged cylinder. The contents of the autoclave are then heated to 55°C. and held until the pressure drop indicates all monomers have been consumed.

Surfactant A gave a fluid latex with no coagulum. The phosphate ester of 2-ethylhexanol, namely

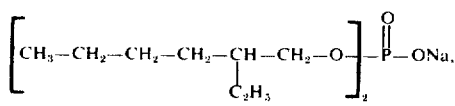

gave massive coagulum and the polymerization failed to go to completion. This illustrates the need for straight chain $C_8$ to $C_{10}$ alkyl in the phosphate ester.

We claim:

1. In a process for the emulsion polymerization of at least one olefinic monomer containing at least one olefinic carbon-to-carbon double bond, wherein said monomer is polymerized in an aqueous medium in the presence of a surfactant and a water-soluble initiator, the improvement wherein the surfactant is selected from the group consisting of phosphate esters having the formula (I)   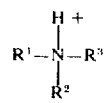

and (II)   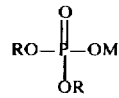

and mixtures of (I) and (II) thereof, wherein M is hydrogen, alkali metal, or an ammonium or amino cation having the formula

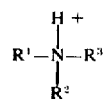

wherein $R^1$, $R^2$ and $R^3$ are independently hydrogen, alkyl of 1 to 6 carbon atoms, hydroxyalkyl of 1 to 6 carbon atoms or cycloalkyl of 3 to 6 carbon atoms and R is a straight chain alkyl of 8 to 10 carbon atoms.

2. The process according to claim 1, wherein said olefinic monomer is a vinyl halide.

3. The process according to claim 1, wherein said olefinic monomer is a mixture of a vinyl halide and a co-monomer.

4. The process according to claim 3, wherein said co-monomer is a vinyl ester or an ester of an olefinically unsaturated acid.

5. The process according to claim 1, wherein said phosphate ester is a mixture of esters of formulas (I) and (II).

6. The process according to claim 1, wherein R is n-octyl or n-decyl.

7. The process according to claim 1, wherein M is hydrogen.

8. The process according to claim 1, wherein M is an alkali metal.

9. The process according to claim 1, wherein M is an ammonium or amino cation having the formula

wherein $R^1$, $R^2$ and $R^3$ are independently hydrogen, alkyl of 1 to 6 carbon atoms, hydroxyalkyl of 1 to 6 carbon atoms and cycloalkyl of 3 to 6 carbon atoms.

10. The process according to claim 1 wherein said olefinic monomer is vinyl chloride.

11. The process according to claim 1 wherein said olefinic monomer is a mixture of vinyl chloride and vinyl acetate.

12. The process according to claim 1 wherein the surfactant is present in the aqueous medium in amounts between about 2 and about 10 wt. % based on olefinic monomer.

* * * * *